United States Patent

Misawa et al.

Patent Number: 5,618,868
Date of Patent: Apr. 8, 1997

[54] POLARIZING FILM OF A HYDROPHILIC POLYMER FILM CONTAINING A NOVEL AZO COMPOUND

[75] Inventors: Tsutami Misawa, Kanagawa-ken; Akira Ogiso, Fukuoka-ken; Rihoko Imai, Tokyo; Hisato Itoh, Kanagawa-ken, all of Japan

[73] Assignee: Mitsui Toatsu Chemicals, Inc., Tokyo, Japan

[21] Appl. No.: 223,740

[22] Filed: Apr. 6, 1994

[30] Foreign Application Priority Data

Apr. 21, 1993 [JP] Japan ................................. 5-094057
Apr. 21, 1993 [JP] Japan ................................. 5-094058

[51] Int. Cl.$^6$ ................................................. C08K 5/23
[52] U.S. Cl. ........................ 524/159; 430/176; 524/557
[58] Field of Search ................................. 524/159, 557; 430/563, 157, 163, 171, 176, 183

[56] References Cited

U.S. PATENT DOCUMENTS 4,116,861  9/1971  Affergut ............................. 252/299.01
4,118,182  10/1978 Smith .

FOREIGN PATENT DOCUMENTS 342241  11/1989  European Pat. Off. .

OTHER PUBLICATIONS

Chemical Abstracts, vol. 102, pp. 93, 26357w, 1985.
Chemical Abstracts, vol. 104, pp. 77, 70283j, 1986.
Chemical Abstracts, vol. 104, pp. 53, 69953w, 1986.
Chemical Abstract, vol. 115, pp. 706, 266442g, 1991.
Chemical Abstract, vol. 116, pp. 683, 224369d, 1992.

Primary Examiner—Christopher Henderson
Attorney, Agent, or Firm—Burns, Doane, Swecker & Mathis

[57] ABSTRACT

The present invention is concerned with a novel azo compound represented by formula (1), (2) or (3), a water-soluble dye comprising this azo compound, and a polarizing film containing this azo compound. The obtained polarizing film has high hydrothermoresistance and a high polarization degree and is excellent in optical characteristics:

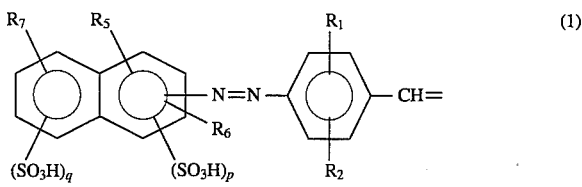

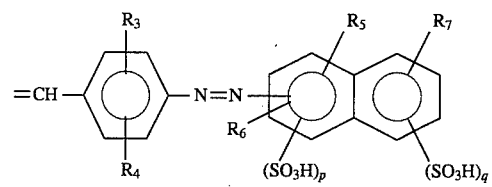

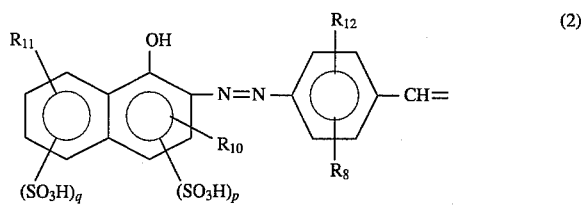

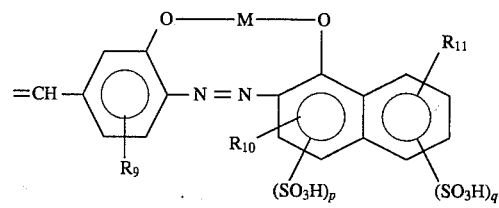

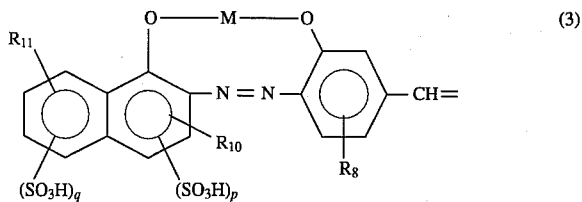

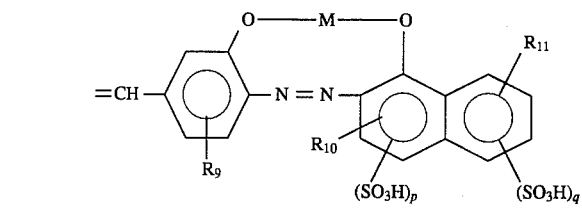

wherein each of $R_1$, $R_3$ and $R_{12}$ is independently a hydrogen atom, halogen atom, hydroxyl group, alkyl group having 1 or 2 carbon atoms, or alkoxy group having 1 or 2 carbon atoms; each of $R_2$, $R_4$, $R_8$ and $R_9$ is independently a hydrogen atom, hydroxyl group, alkyl group having 1 or 2 carbon atoms, alkoxy group having 1 or 2 carbon atoms, or acetylamino group; $R_5$ is a hydroxyl group or amino group at the o-position or p-position to the azo group; each of $R_6$ and $R_{10}$ is a hydrogen atom, carboxyl group, or alkoxy group having 1 or 2 carbon atoms; each of $R_7$ and $R_{11}$ is a hydrogen atom, hydroxyl group, amino group, methylamino group, β-hydroxyethylamino group, acetylamino group, or phenylamino or benzoylamino group in which the phenyl nucleus may be substituted by a nitro group, amino group, hydroxyl group, alkyl group having 1 or 2 carbon atoms, carboxyl group, sulfonic group or chlorine atom; p is 0 or 1; and q is 0, 1 or 2.

6 Claims, No Drawings

POLARIZING FILM OF A HYDROPHILIC POLYMER FILM CONTAINING A NOVEL AZO COMPOUND

BACKGROUND OF THE INVENTION

1. Field of the Invention

The present invention relates to a novel azo compound, its metal complex compound, a water-soluble azo dye containing the same, and a polarizing film having a high polarization degree in which the above-mentioned dye is contained and oriented as a dichromatic dye in a polymer film.

2. Description of the Prior Art

As a polarizing element for use in a polarizing film, iodine has heretofore been used, and in recent years, the utilization of organic dyes has also been investigated.

However, iodine which has heretofore been used has a high polarization performance, but since having large sublimation properties, iodine is disadvantageously poor in heat resistance, when added as the polarizing element to a polarizing film.

In order to overcome this drawback, there have been suggested some polarizing films containing organic dyes as the polarizing elements and having improved heat resistance in Japanese Patent Publication Nos. 61988/1990 [CA 102(4): 26357w], 50944/1992 [CA 104(10): 70283j], 61893/1992 [CA 104(10): 69953w], U.S. Pat. No. 4,514,559, Japanese Patent Application Laid-open Nos. 269136/1990 (U.S. Pat. No. 5,007,942), 222459/1990 (U.S. Pat. No. 5,272,259), 226162/1992 (U.S. Pat. No. 5,122,557); 68902/1991 (CA 115(24): 266442g) and 89203/1991 [CA 116(22): 224369d).

However, such polarizing films are not always satisfactory from the standpoint of polarizing performance.

Thus, it is desired to develop a dye for a dye-based polarizing film which can exert the polarizing performance comparable to that of an iodine-based polarizing film.

SUMMARY OF THE INVENTION

An object of the present invention is to provide an azo compound suitable for a polarizing film containing a polymer film as a base material, and a high-performance polarizing film having excellent polarizing properties and heat resistance obtained by orienting and adding the compound.

The present inventors have conducted research with the intention of obtaining a polarizing film containing an azo compound as a polarizing element that has excellent polarizing performance and high hydrothermo-resistance, and as a result, the present invention has now been attained. That is, one aspect of the present invention is directed to an azo compound represented by formula (1), (2) or (3):

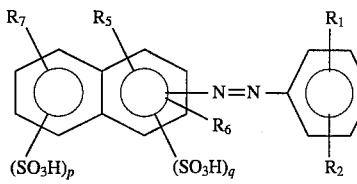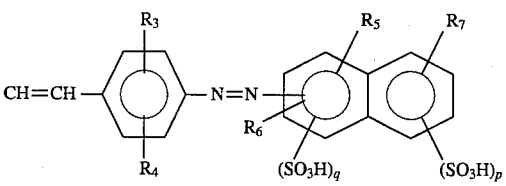 (1)

wherein each of $R_1$ and $R_3$ is independently a hydrogen atom, halogen atom, hydroxyl group, alkyl group having 1 or 2 carbon atoms, or alkoxy group having 1 or 2 carbon atoms; each of $R_2$ and $R_4$ is independently a hydrogen atom, hydroxyl group, alkyl group having 1 or 2 carbon atoms, alkoxy group having 1 or 2 carbon atoms, or acetylamino group; $R_5$ is a hydroxyl group or amino group at the o-position or p-position to the azo group; $R_6$ is a hydrogen atom, carboxyl group, or alkoxy group having 1 or 2 carbon atoms; $R_7$ is a hydrogen atom, hydroxyl group, amino group, methylamino group, β-hydroxyethylamino group, acetylamino group, or phenylamino or benzoylamino group in which the phenyl nucleus may be substituted by a nitro group, amino group, hydroxyl group, alkyl group having 1 or 2 carbon atoms, carboxyl group, sulfonic group or chlorine atom; p is 0 or 1; and q is 0, 1 or 2,

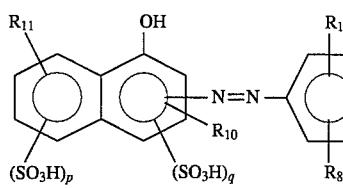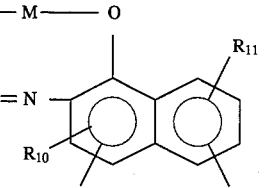 (2)

wherein each of $R_8$ and $R_9$ is independently a hydrogen atom, hydroxyl group, alkyl group having 1 or 2 carbon atoms, alkoxy group having 1 or 2 carbon atoms, or acetylamino group; $R_{10}$ is a hydrogen atom, carboxyl group, or alkoxy group having 1 or 2 carbon atoms; $R_{11}$ is a hydrogen atom, hydroxyl group, amino group, methylamino group, β-hydroxyethylamino group, acetylamino group, or phenylamino or benzoylamino group in which the phenyl nucleus may be substituted by a nitro group, amino group, hydroxyl group, alkyl group having 1 or 2 carbon atoms, carboxyl group, sulfonic group or chlorine atom; $R_{12}$ is a hydrogen atom, hydroxyl group, alkyl group having 1 or 2 carbon atoms, or alkoxy group having 1 or 2 carbon atoms; p is 0 or 1; q is 0, 1 or 2; and M is copper, nickel, zinc or iron,

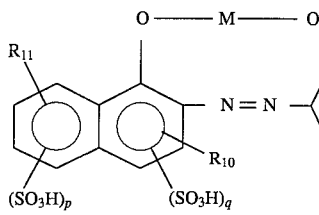 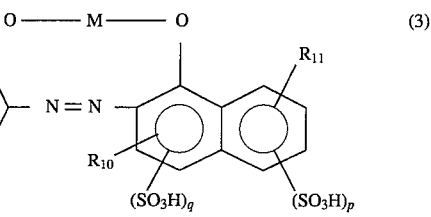

(3)

wherein each of $R_8$ and $R_9$ is independently a hydrogen atom, hydroxyl group, alkyl group having 1 or 2 carbon atoms, alkoxy group having 1 or 2 carbon atoms, or acetylamino group; $R_{10}$ is a hydrogen atom, carboxyl group, or alkoxy group having 1 or 2 carbon atoms; $R_{11}$ is a hydrogen atom, hydroxyl group, amino group, methylamino group, β-hydroxyethylamino group, acetylamino group, or phenylamino or benzoylamino group in which the phenyl nucleus may be substituted by a nitro group, amino group, hydroxyl group, alkyl group having 1 or 2 carbon atoms, carboxyl group, sulfonic group or chlorine atom; p is 0 or 1; q is 0, 1 or 2; and M is copper, nickel, zinc or iron.

Furthermore, the present invention is directed to a water-soluble dye comprising the above-mentioned compound, a polarizing film in which the above-mentioned compound is oriented and contained in a polymer film, and a method for preparing a polarizing film which comprises stretching, at a stretch ratio of from 2 times to 9 times, a polymer film dyed with the above-mentioned water-soluble dye.

The water-soluble dye comprising the novel azo compound of the present invention and the polarizing film using this dye can provide industrially valuable and remarkable effects such as high hydrothermoresistance and high polarization degree, and optical characteristics comparable to those of a conventional polarizing film using iodine.

DETAILED DESCRIPTION OF THE PREFERRED EMBODIMENTS

The azo compound represented by formula (1) of the present invention can be prepared by a known diazotization and coupling technique in accordance with a usual preparation method of the azo compound.

That is, the azo compound represented by formula (1) can be obtained in the form of a free acid in accordance with a known process, for example, by first tetrazotizing a diaminostilbene of formula (4):

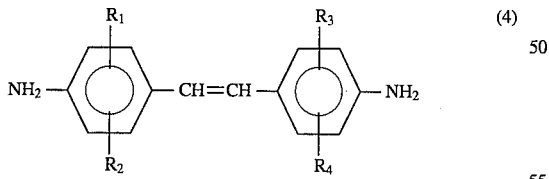

(4)

wherein $R_1$, $R_2$, $R_3$ and $R_4$ are as defined in formula (1), in a known manner, for example, with sodium nitrite at 0°–30° C. in a mineral acid, and then coupling with a naphthalene represented by formula (5):

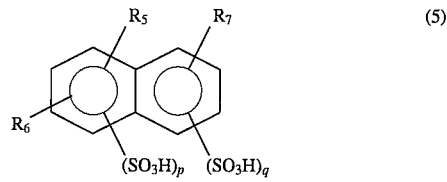

(5)

wherein $R_5$, $R_6$, $R_7$, p and q are as defined in formula (1), at a temperature of 0° to 30° C. at pH 5–10. Needless to say, the azo compound of the present invention can also be prepared by a preparation route other than this procedure.

A preferable example of the compound represented by formula (1) is a compound wherein $R_5$ is a hydroxyl group or amino group at the o-position to the azo group, and $R_7$ is a hydrogen atom, hydroxyl group, amino group, methylamino group, β-hydroxyethylamino group, acetylamino group, phenylamino group or benzoylamino group.

The azo compound represented by formula (2) of the present invention can be prepared by a known diazotization and coupling technique in accordance with a usual preparation method of an azo dye.

That is, an aminostilbene represented by formula (6):

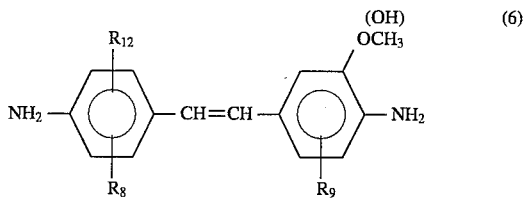

(6)

wherein $R_8$, $R_9$ and $R_{12}$ are as defined in formula (2), is tetrazotized in a known manner, for example, with sodium nitrite at 0°–30° C. in a mineral acid, and then coupled with a naphthalene represented by formula (7):

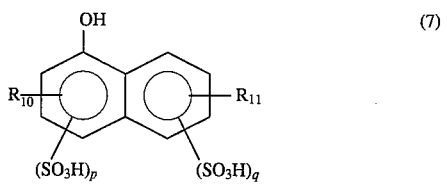

(7)

wherein $R_{10}$, $R_{11}$, p and q are as defined in formula (2), at a temperature of 0° to 30° C. at pH 5–10 to obtain an azo compound represented by formula (8):

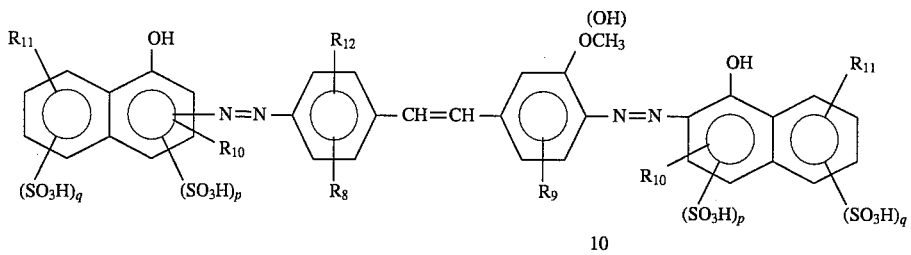

(8)

wherein $R_8$, $R_9$, $R_{10}$, $R_{11}$, $R_{12}$, p and q are as defined in formula (2),
in the form of a free acid. Needless to say, the azo compound of the present invention can also be prepared by a preparation route other than this procedure.

The thus obtained azo compound represented by formula (8) can be easily complexed with a transition metal by the following process to form a transition metal-containing azo compound represented by formula (2) of the present invention.

For example, the azo compound represented by formula (8) is dissolved or dispersed in water and/or a hydrophilic solvent, for example, a mixed solvent of water and ethylene glycol or ethyl cellosolve, and the solution is then mixed with an aqueous solution of copper sulfate, copper chloride, tetraminecopper, copper acetate, nickel sulfate, nickel chloride, nickel acetate, zinc sulfate, zinc chloride, iron sulfate or iron chloride at a temperature of 50° to 100° C., preferably 90° C. or more under alkaline conditions, preferably in the presence of ammonia, monoethanolamine or diethanolamine, thereby obtaining the desired transition metal-containing azo compound represented by formula (2).

A preferable example of the compound represented by formula (2) is a compound wherein $R_{11}$ is a hydrogen atom, hydroxyl group, amino group, methylamino group, β-hydroxyethylamino group, acetylamino group, phenylamino group or benzoylamino group.

Moreover, the azo compound represented by formula (3) of the present invention can be prepared by a known diazotization and coupling technique in accordance with a usual preparation method of an azo dye.

That is, a diaminostilbene represented by formula (9):

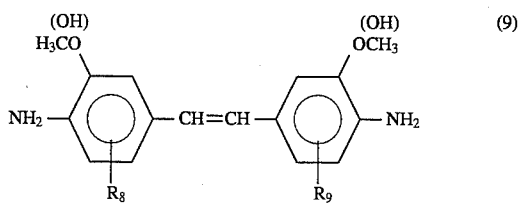

(9)

wherein $R_8$ and $R_9$ are as defined in formula (3), is tetrazotized in a known manner, for example, with sodium nitrite at 0°–30° C. in a mineral acid, and then coupled with a naphthalene represented by formula (10):

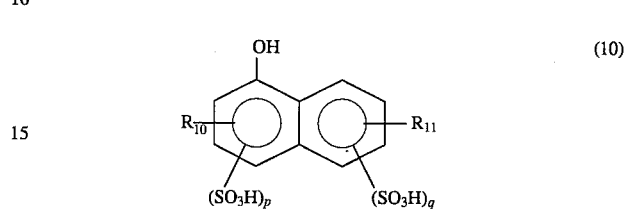

(10)

wherein $R_{10}$, $R_{11}$, p and q are as defined in formula (3), at a temperature of 0° to 30° C. at pH 5–10 to obtain an azo compound represented by formula (11):

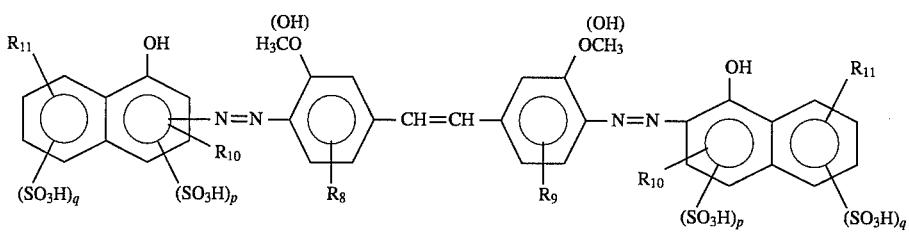

(11)

wherein $R_8$, $R_9$, $R_{10}$, $R_{11}$, p and q are as defined in formula (3),
in the form of a free acid. Needless to say, the azo compound of the present invention can also be prepared by a preparation route other than this procedure.

The thus obtained azo compound represented by formula (11) can be easily complexed with a transition metal by the following process to form a transition metal-containing azo compound represented by formula (3) of the present invention.

For example, the azo compound represented by formula (11) is dissolved or dispersed in water and/or a hydrophilic solvent, for example, a mixed solvent of water and ethylene glycol or ethyl cellosolve, and the solution is then mixed with an aqueous solution of copper (II) sulfate, copper (II) chloride, tetramminecopper (II), copper (II) acetate, nickel (II) sulfate, nickel (II) chloride, nickel (II) acetate, zinc (II) sulfate, zinc (II) chloride, iron (II) sulfate or iron (II) chloride at a temperature of 50° to 100° C., preferably 90° C. or more under alkaline conditions, preferably in the presence of ammonia, monoethanolamine or diethanolamine, thereby obtaining the desired transition metal-containing azo compound represented by formula (3).

A preferable example of the compound represented by formula (3) is a compound wherein $R_{11}$ is a hydrogen atom, hydroxyl group, amino group, methylamino group, β-hydroxyethylamino group, acetylamino group, phenylamino group or benzoylamino group.

The azo compounds represented by formulae (1), (2) and (3) of the present invention are usually utilized in the form of sodium salts, but they can also be utilized in the form of free acids or other salts such as potassium salts, lithium salts, ammonium salts, alkylamine salts and ethanolamine salts.

In the present invention, the diaminostilbenes represented by formulae (4), (6) and (9) can be prepared by usual methods. For example, typical known preparation methods of these diaminostilbenes are described in Kogyo Kagaku Zasshi (J. Chem. Soc. Jpn. Ind. Chem. Sect.), Vol. 73, No. 1, pp. 187–194 (1970) or Indian Journal of Chemistry, Vol. 25B, pp. 485–488, May 1986.

That is, in the case of a typical example, a compound represented by formula (12) and a compound of formula (13) are reacted with each other at a temperature of 100° to 200° C. in the presence of a base such as piperidine in an aprotic polar solvent such as N,N-dimethylformamide, or alternatively, they are reacted at a temperature of 10° to 100° C. in the presence of a catalyst such as benzyltriethylammonium chloride (BTEA) in an aqueous alkaline solution to obtain a compound represented by formula (14):

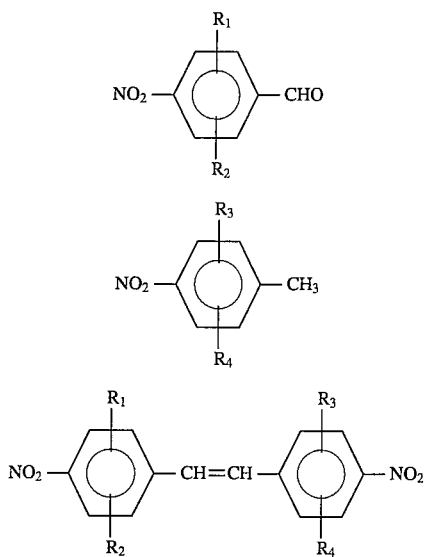

wherein $R_1$, $R_2$, $R_3$ and $R_4$ are as defined in formula (1).

Furthermore, nitro groups of the compound represented by formula (14) can be reduced in a known manner to obtain any of the desired diaminostilbenes represented by formulae (4), (6) and (9).

Typical examples of the naphthalenes represented by formulae (5), (7) and (10) include 1-hydroxy-6-aminonaphthalene-3-sulfonic acid (hereinafter abbreviated to "J acid"), N-phenyl J acid, N-methyl J acid, N-acetyl J acid, N-methyl-N-acetyl J acid, N-benzoyl J acid, N-(3- or 4-carboxyphenyl) J acid, N-(3-or 4-sulfophenyl) J acid, N-(4-amino-3-sulfophenyl) J acid, N-(4-hydroxy-3-carboxyphenyl) J acid, N-(4-aminobenzoyl) J acid, N-(4-amino-3-sulfobenzoyl) J acid, N-(4-hydroxy-3-carboxybenzoyl) J acid, N-(4-nitrophenyl) J acid, N-(4-nitrobenzoyl) J acid, N-(4-amino-3-methylbenzoyl) J acid, N-(3- or 4-carboxybenzoyl) J acid, N-(3-or 4-sulfobenzoyl) J acid, N-(β-hydroxyethyl) J acid, 1-hydroxy-7-aminonaphthalene-3-sulfonic acid (hereinafter abbreviated to "γ acid"), N-phenyl γ acid, N-methyl γ acid, N-acetyl γ acid, N-methyl-N-acetyl γ acid, N-benzoyl γ acid, N-(3- or 4-carboxyphenyl) γ acid, N-(3- or 4-sulfophenyl) γ acid, N-(4-amino-3-sulfophenyl) γ acid, N-(4-hydroxy-3-carboxyphenyl) γ acid, N-(4-aminophenyl) γ acid, N-(4-amino-3sulfobenzoyl) γ acid, N-(4-hydroxy-3-carboxybenzoyl) γ acid, N-(4-nitrophenyl) γ acid, N-(4-nitrobenzoyl) γ acid, N-(4-amino-3-methylbenzoyl) γ acid, N-(3- or 4-carboxybenzoyl) γ acid, N-(3- or 4-sulfobenzoyl) γ acid, N-(β-hydroxyethyl) γ acid, 1-hydroxy-8-aminonaphthalene-3,6-disulfonic acid (hereinafter abbreviated to "H acid"), N-acetyl H acid, N-benzoyl H acid, N-(p-toluenesulfonyl) H acid, N-(benzenesulfonyl) H acid, N-(p-chlorobenzoyl) H acid, 1-hydroxy-8-aminonaphthalene-3,5-disulfonic acid (hereinafter abbreviated to "K acid"), N-acetyl K acid, 1-hydroxy-8-aminonaphthalene-5,7-disulfonic acid, 1-hydroxy-7-aminonaphthalene-3,6-disulfonic acid, N-(p-methylphenyl) J acid, 1-naphthol-3,6-disulfonic acid and 1-amino-2-ethoxynaphthalene-6-sulfonic acid. A part of these naphthalenes are commercially available.

A preferable example of the polymer film for use in the polarizing film of the present invention is a hydrophilic polymer film, and typical examples of its material include polyvinyl alcohol, polyvinyl formal, polyvinyl acetal, polyvinyl butyral, copolymers thereof with ethylene, propylene, acrylic acid or N-acryloyhnaleimide, and cellulosic resins. These high polymers are particularly useful, because they are excellent in solubility in water or a hydrophilic organic solvent, compatibility with the compound of the present invention and film-forming properties, and they also permit the compound of the present invention to be easily oriented at the time of stretching/orientation after the film formation.

As methods for preparing the polarizing film of the present invention by the use of the above-mentioned high polymer and the compound of the present invention, there are (1) a method which comprises forming a film from the high polymer, stretching the film, and then dyeing the stretched film with the compound of the present invention; (2) a method which comprises forming a film from the high polymer, dyeing the film with the compound of the present invention, and then stretching the dyed film; and (3) a method which comprises adding the compound of the present invention to a solution of the high polymer, forming a dyed film and then stretching the dyed film.

The above-mentioned method (3) for preparing the dyed film can be usually carried out by the following procedure. That is, the high polymer is dissolved in water and/or a hydrophilic organic solvent such as an alcohol, glycerin or dimethylformamide, adding the compound of the present invention to the solution to perform dope-dyeing, and then forming the dyed film from the dyed solution by flow casting, solution coating, extrusion or the like.

The concentration of the high polymer which is dissolved in the solvent depends upon the kind of high polymer itself, but it is in the range of 5 to 30 wt %, preferably 10 to 20 wt %. Furthermore, the concentration of the compound of the present invention which is dissolved in the solvent depends upon the kind of high polymer, the kind of compound, the thickness of the formed film, the required performance of the obtained polarizing film and the like, but it is in the range of about 0.1 to 5 wt %, preferably about 0.8 to 2.5 wt % based on the weight of the high polymer.

The above-mentioned methods (1) and (2) can be carried out by the following procedure. That is, if necessary, an inorganic salt such as sodium chloride or Glauber's salt and a dyeing assistant such as a surface active agent are added to a dye bath containing 0.1 to 5 wt %, preferably 0.8 to 2.5 wt % of the compound of the present invention based on the weight of the film, and the high polymer film is then immersed in the dye bath at 20°–80° C., preferably 30°–50° C. for a period of 1–60 minutes, preferably 3–20 minutes to dye the film, followed by drying.

As techniques of the stretching in the above-mentioned (1), (2) and (3), there are draw stretching in a wet manner, draw stretching in a dry manner and compressive stretching between rolls in a dry manner, and any of these techniques can be employed. A stretch ratio is in the range of from 2 times to 9 times, but when polyvinyl alcohol or its derivative is used, the stretch ratio is preferably in the range of from 2.5 times to 6 times.

After the stretching/orientation treatment, a boric acid treatment is carried out for the purpose of improving the water resistance and the polarizing properties of the stretched film. The boric acid treatment permits the improvement of the light transmission and the polarization degree of the polarizing film. Conditions for the boric acid treatment depend upon the kind of hydrophilic high polymer to be used and the kind of the azo compound, but in general, the concentration of boric acid is in the range of 1 to 15 wt %, preferably 3 to 10 wt % and a treatment temperature is in the range of 30° to 80° C., preferably 40° to 80° C. If the concentration of boric acid is less than 1 wt % and/or the treatment temperature is less than 30° C., the effect of this treatment is low, and if the concentration of boric acid is more than 15 wt % and/or the treatment temperature is more than 80° C., the obtained polarizing film is liable to be brittle.

The azo compounds represented by formulae (1), (2) and (3) can be used singly or in combination thereof, and these compounds may be blended with another dye to prepare the polarizing film having an optional hue and the high polarization degree.

As the other dye usable in this case, any dye can be used, so long as it is a dye having a high dichroism and having an absorption in a wavelength region different from that of the compound which are obtained in the present invention. Particularly preferable examples of the dye include, in terms of C. I. Generic Names, C. I. Direct Yellow 12, C. I. Direct Yellow 44, C. I. Direct Yellow 28, C. I. Direct Yellow 142, C. I. Direct Red 2, C. I. Direct 10 Red 79, C. I. Direct Red 81, C. I. Direct Red 247, C. I. Direct Violet 9, C. I. Direct Violet 51, C. I. Direct Orange 26, C. I. Direct Orange 39, C. I. Direct Orange 107, C. I. Direct Blue 1, C. I. Direct Blue 71, C. I. Direct Blue 78, C. I. Direct Blue 168, C. I. Direct Brown 106, C. I. Direct Brown 223, C. I. Direct Green 85, C. I. Direct Black 17 and C. I. Direct Black 19.

When the compound represented by formula (1), (2) or (3) is used as the blend component for gray or black which is particularly often used, the polarizing film having an excellent polarizing performance and preferable absorption characteristics can be obtained. In addition, the polarizing film is also excellent in hydrothermo-resistance.

The thus prepared polarizing film can be used, after being subjected to some of various treatments. For example, in addition to its direct usage as the film or sheet, a protective layer of a polymer such as a triacetate, acrylate or urethane may be formed on the polarizing film by lamination prior to use, or a transparent conductive film such as an indium-tin oxide may be formed on the surface of the polarizing film by vapor deposition, sputtering or coating in compliance with the intended purpose.

Next, the present invention will be described in detail with reference to examples, but these examples are merely exemplary and the scope of the present invention should not be limited to them. In the examples, part and parts mean part by weight and parts by weight, respectively.

In the present invention, the polarization degree is a value measured in the following manner. That is, two polarizing films were put on a light path of a spectrophotometer, with the two polarizing films being superposed upon each other so that the stretching directions of these films might be parallel, and a light transmission (Tp) at a maximum absorption wavelength in a visible region was measured. On the other hand, the two polarizing films were superposed upon each other so that the stretching directions of these films might cross at right angles, and another light transmission (Tc) was measured at the same wavelength. On the basis of the thus measured values (Tp) and (Tc), the polarization degree (V) was calculated by the use of the following formula:

$$V = \sqrt{\frac{Tp - Tc}{Tp + Tc}} \times 100\ (\%)$$

EXAMPLE 1

10 parts (0.035 mol) of 4,4'-diaminostilbene 2HCl were suspended in 200 parts of water, and 14.6 parts of concentrated hydrochloric acid were then added thereto. Afterward, the solution was cooled to 5°–10° C. on ice, and 5.2 parts (0.075 mol) of sodium nitrite were then added and tetrazotization was carried out for 1 hour. Next, excess sodium nitrite was removed with sulfamic acid. The resulting aqueous tetrazonium salt solution was added dropwise at 5°–10° C. to a solution obtained by dissolving 26.6 parts (0.078 mol) of monosodium 1-amino-8-naphthol-2,4-disulfonate in 550 parts of a 3.3% aqueous caustic soda solution to perform coupling. After stirring for 2 hours, a large excess of sodium chloride was added to conduct salting-out. After stirring overnight, the resulting precipitate was collected by filtration, washed with a 3% aqueous sodium chloride solution, and then dried to obtain 28 parts of an azo compound represented by the following formula (15). Its yield was 91.8%.

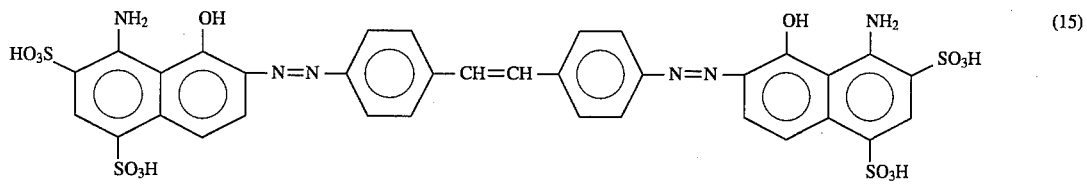

(15)

Composition formula: $C_{34}H_{26}N_6O_{14}S_4$

Values of elemental analysis:

|  | C | H | N | S |
| --- | --- | --- | --- | --- |
| Found (%) | 46.89 | 3.01 | 9.65 | 14.73 |
| Calcd. (%) | 46.72 | 3.00 | 9.57 | 14.80 |

A 0.3 g/l dye bath of the compound of formula (15) was prepared and then maintained at 42° C. Afterward, a polyvinyl alcohol film having a thickness of 75 μm was immersed in the dye bath, and then dyed for 2 minutes. The wet dyed film was stretched 5 times at 43° C. in a 3% aqueous boric acid solution, washed with water in this state, and then dried to form a blue polarizing film. A polarization degree V of this polarizing film at an absorption maximum $\lambda_{max}$ was measured, and as a result, single plate transmission was 43%, $\lambda_{max}$ was 650 nm, and V was 99.4%.

This polarizing film was allowed to stand for 500 hours under conditions of 80° C. and a relative humidity of 85%, but a change of hue and the deterioration of the polarization degree were not substantially observed.

EXAMPLE 2

The same procedure as in Example 1 was carried out except that monosodium 1-amino-8-naphthol-2,4-disulfonate was replaced with 26.6 parts (0.08 mol) of monosodium 1-hydroxy-8-aminonaphthalene-3,6-disulfonate, to obtain 29 parts of an azo compound represented by the following formula (16). Its yield was 95.1%.

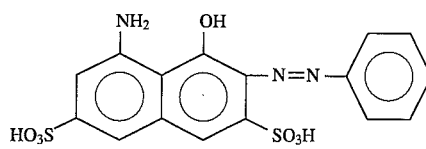

Composition formula: $C_{34}H_{26}N_6O_{14}S_4$

Values of elemental analysis:

|  | C | H | N | S |
|---|---|---|---|---|
| Found (%) | 46.89 | 3.01 | 9.65 | 14.73 |
| Calcd. (%) | 46.81 | 2.96 | 9.80 | 14.61 |

A polyvinyl alcohol film was treated with an aqueous solution of the compound of formula (16) in the same manner as in Example 1 to prepare a polarizing film. This polarizing film was blue. A polarization degree V of the polarizing film at an absorption maximum $\lambda_{max}$ was measured, and as a result, single plate transmission was 43%, $\lambda_{max}$ was 630 nm, and V was 99.0%.

This polarizing film was allowed to stand for 500 hours under conditions of 80° C. and a relative humidity of 85%, but a change of hue and the deterioration of the polarization degree were not substantially observed.

EXAMPLE 3

8 parts (0.033 mol) of 3-methoxy-4,4'-diaminostilbene were suspended in 160 parts of water, and 20.6 parts of concentrated hydrochloric acid were then added thereto. Afterward, the solution was cooled to 5°–10° C. on ice, and 5.0 parts (0.072 mol) of sodium nitrite were then added and tetrazotization was carried out for 1 hour. Next, excess sodium nitrite was removed with sulfamic acid. The resulting aqueous tetrazonium salt solution was added dropwise at 5°–10° C. to a solution obtained by dissolving 25 parts (0.073 mol) of monosodium 1-amino-8-naphthol-2,4-disulfonate in 550 parts of a 9% aqueous sodium carbonate solution to perform coupling. After stirring for 2 hours, a large excess of sodium chloride was added to conduct salting-out. After stirring overnight, the resulting precipitate was collected by filtration, washed with a 3% aqueous sodium chloride solution, and then dried to obtain 28 parts of an azo compound represented by the following formula (17). Its yield was 94.3%.

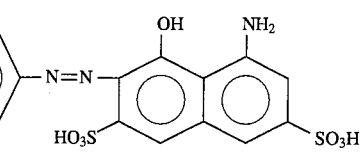

Composition formula: $C_{35}H_{28}N_6O_{15}S_4$

Values of elemental analysis:

|  | C | H | N | S |
|---|---|---|---|---|
| Found (%) | 46.66 | 3.13 | 9.33 | 14.23 |
| Calcd. (%) | 46.48 | 3.20 | 9.45 | 14.16 |

A polyvinyl alcohol film was treated with an aqueous solution of the compound of formula (17) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 660 nm, and V was 99.0%.

This polarizing film was allowed to stand for 500 hours under conditions of 80° C. and a relative humidity of 85%, but a change of hue and the deterioration of the polarization degree were not substantially observed.

EXAMPLE 4

The same procedure as in Example 3 was carried out except that monosodium 1-amino-8-naphthol-2,4-disulfonate was replaced with 25 parts (0.073 mol) of monosodium 1-hydroxy-8-aminonaphthalene-3,6-disulfonate, to obtain 29 parts of an azo compound represented by the following formula (18). Its yield was 97.6%.

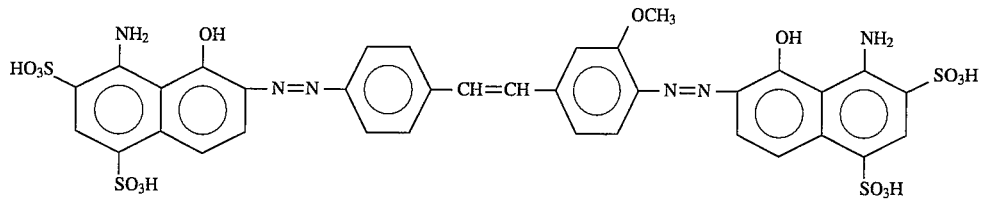

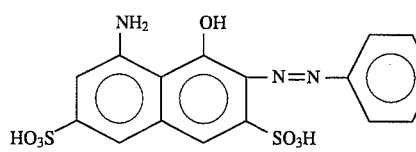 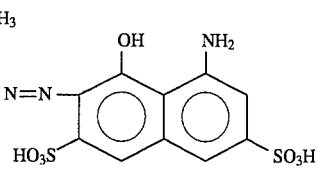 (18)

Composition formula: $C_{35}H_{28}N_6O_{15}S_4$

Values of elemental analysis:

|  | C | H | N | S |
|---|---|---|---|---|
| Found (%) | 46.66 | 3.13 | 9.33 | 14.23 |
| Calcd. (%) | 46.52 | 3.29 | 9.37 | 14.38 |

A polyvinyl alcohol film was treated with an aqueous solution of the compound of formula (18) in the same manner as in Example 1 to prepare a polarizing film. This polarizing film was blue. A polarization degree V of the polarizing film at an absorption maximum $\lambda_{max}$ was measured, and as a result, single plate transmission was 43%, $\lambda_{max}$ was 645 nm, and V was 99.0%.

This polarizing film was allowed to stand for 500 hours under conditions of 80° C. and a relative humidity of 85%, but a change of hue and the deterioration of the polarization degree were not substantially observed.

EXAMPLE 5

9 parts (0.033 mol) of 3,3'-dimethoxy-4,4'-diaminostilbene were suspended in 160 parts of water, and 20.6 parts of concentrated hydrochloric acid were then added thereto. Afterward, the solution was cooled to 5°–10° C. on ice, and 5.0 parts (0.072 mol) of sodium nitrite were then added and tetrazotization was carried out for 1 hour. Next, excess sodium nitrite was removed with sulfamic acid. The resulting aqueous tetrazonium salt solution was added dropwise at 5°–10° C. to a solution obtained by dissolving 25 parts (0.073 mol) of monosodium 1-amino-8-naphthol-2,4-disulfonate in 550 parts of a 9% aqueous sodium carbonate solution to perform coupling. After stirring for 2 hours, a large excess of sodium chloride was added to conduct salting-out. After stirring overnight, the resulting precipitate was collected by filtration, washed with a 3% aqueous sodium chloride solution, and then dried to obtain 29 parts of an azo compound represented by formula (19). Its yield was 94.5%.

A polyvinyl alcohol film was treated with an aqueous solution of the compound of formula (19) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 675 nm, and V was 99.0%.

This polarizing film was allowed to stand for 500 hours under conditions of 80° C. and a relative humidity of 85%, but a change of hue and the deterioration of the polarization degree were not substantially observed.

EXAMPLE 6

The same procedure as in Example 5 was carried out except that monosodium 1-amino-8-naphthol-2,4-disulfonate was replaced with 25 parts (0.073 mol) of monosodium 1-hydroxy-8-aminonaphthalene-3,6-disulfonate, to obtain 30 parts of an azo compound represented by the following formula (20). Its yield was 97.7%.

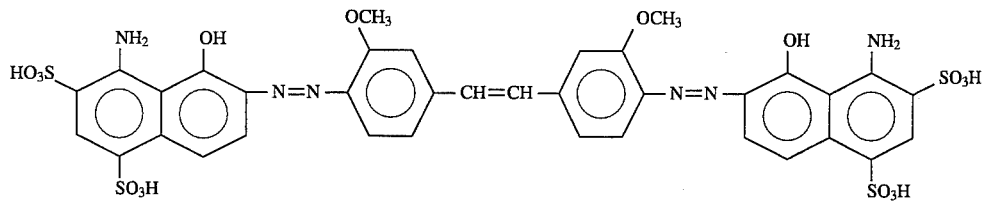 (19)

Composition formula: $C_{36}H_{30}N_6O_{16}S_4$

Values of elemental analysis:

|  | C | H | N | S |
|---|---|---|---|---|
| Found (%) | 46.45 | 3.25 | 9.03 | 13.78 |
| Calcd. (%) | 46.52 | 3.41 | 8.95 | 14.01 |

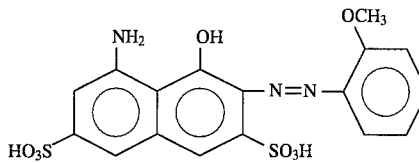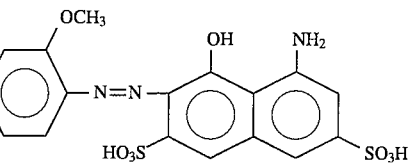 (20)

Composition formula: $C_{36}H_{30}N_6O_{16}S_4$

Values of elemental analysis:

|  | C | H | N | S |
|---|---|---|---|---|
| Found (%) | 46.45 | 3.25 | 9.03 | 13.78 |
| Calcd. (%) | 46.59 | 3.16 | 9.18 | 13.85 |

A polyvinyl alcohol film was treated with an aqueous solution of the compound of formula (20) in the same manner as in Example 1 to prepare a polarizing film. This polarizing film was blue. A polarization degree V of the polarizing film at an absorption maximum $\lambda_{max}$ was measured, and as a result, single plate transmission was 43%, $\lambda_{max}$ was 660 nm, and V was 99.0%.

This polarizing film was allowed to stand for 500 hours under conditions of 80° C. and a relative humidity of 85%, but a change of hue and the deterioration of the polarization degree were not substantially observed.

EXAMPLES 7 TO 26

Following the same procedure as in Examples 1 to 6, compounds of formula (1) shown in Table 1 were prepared. In this table, hue, $\lambda_{max}$, single plate transmission and polarization degree were all measured for dyed PVA films. With regard to hydrothermoresistance, each polarizing film was allowed to stand for 500 hours under conditions of 80° C. and a relative humidity of 85%, and afterward, the change of hue and the deterioration of the polarization degree were observed. The polarizing film in which neither change of hue nor the deterioration of the polarization degree was observed was evaluated to be ○.

TABLE 1

| Example | Structural Formula | $\lambda_{max}$ (nm) | A*1 | B*2 | Hue | C*3 |
|---|---|---|---|---|---|---|
| 7 | (structure) | 610 | 41 | 98 | Blue | ○ |
| 8 | (structure) | 650 | 42 | 98 | Blue | ○ |
| 9 | (structure) | 595 | 42 | 99 | Violet blue | ○ |
| 10 | (structure) | 545 | 41 | 99 | Red | ○ |
| 11 | (structure) | 615 | 41 | 98 | Blue | ○ |
| 12 | (structure) | 620 | 42 | 97 | Blue | ○ |
| 13 | (structure) | 645 | 42 | 98 | Blue | ○ |

TABLE 1-continued

| Example | Structural Formula | $\lambda_{max}$ (nm) | A*1 | B*2 | Hue | C*3 |
|---|---|---|---|---|---|---|
| 14 | | 625 | 42 | 99 | Blue | ○ |
| 15 | | 635 | 42 | 99 | Blue | ○ |
| 16 | | 650 | 42 | 99 | Blue | ○ |
| 17 | | 620 | 42 | 99 | Blue | ○ |
| 18 | | 610 | 42 | 99 | Blue | ○ |
| 19 | | 625 | 42 | 99 | Blue | ○ |
| 20 | | 620 | 42 | 99 | Blue | ○ |
| 21 | | 655 | 42 | 99 | Blue | ○ |

TABLE 1-continued

| Example | Structural Formula | $\lambda_{max}$ (nm) | A*1 | B*2 | Hue | C*3 |
|---|---|---|---|---|---|---|
| 22 | | 660 | 42 | 99 | Blue | ○ |
| 23 | | 615 | 42 | 99 | Blue | ○ |
| 24 | | 655 | 42 | 99 | Blue | ○ |
| 25 | | 645 | 42 | 99 | Blue | ○ |
| 26 | | 595 | 42 | 99 | Blue | ○ |

*1: Single plate transmission
*2: Polarization degree
*3: Hydrothermoresistance

EXAMPLE 27

15 parts (0.017 mol) of the compound represented by formula (17) described in Example 3 were dissolved in 300 parts of water, and 10 parts (0.164 mol) of monoethanolamine, 5.3 parts (0.034 mol) of anhydrous copper (II) sulfate and 4.2 parts (0.034 mol) of aqueous ammonia were then added thereto, followed by heating at 80° C. for 8 hours. Next, a large excess of sodium chloride was added to conduct salting-out, and after stirring overnight, the resulting precipitate was collected by filtration, washed with a 3% aqueous sodium chloride solution, and then dried to obtain 15.5 parts of an azo compound represented by the following formula (21). Its yield was 96.2%.

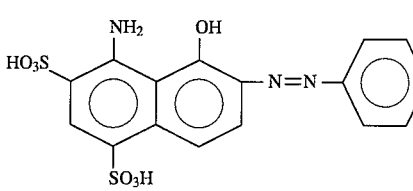

Composition formula: $C_{34}H_{24}N_6O_{15}S_4Cu$

Values of elemental analysis:

|  | C | H | N | S |
|---|---|---|---|---|
| Found (%) | 43.06 | 2.55 | 8.86 | 13.52 |
| Calcd. (%) | 42.88 | 2.60 | 8.90 | 13.75 |

A polyvinyl alcohol film was treated with an aqueous solution of the compound of formula (21) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 690 nm, and V was 99.5%.

This polarizing film was allowed to stand for 500 hours under conditions of 80° C. and a relative humidity of 85%, but a change of hue and the deterioration of the polarization degree were not substantially observed.

EXAMPLE 28

The same procedure as in Example 27 was carried out except that the compound of formula (17) and anhydrous copper sulfate were replaced with 15 parts (0.017 mol) of the compound represented by formula (18) in Example 4 and 5.3 parts (0.038 mol) of nickel (II) sulfate, respectively, to obtain 15 parts of an azo compound represented by the following formula (22). Its yield was 93.8%.

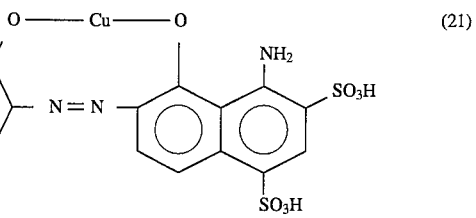

Composition formula: $C_{34}H_{24}N_6O_{15}S_4Ni$

Values of elemental analysis:

|  | C | H | N | S |
|---|---|---|---|---|
| Found (%) | 43.28 | 2.56 | 8.91 | 13.59 |
| Calcd. (%) | 43.19 | 2.60 | 8.85 | 13.75 |

A polyvinyl alcohol film was treated with an aqueous solution of the compound of formula (22) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 685 nm, and V was 99.0%.

This polarizing film was allowed to stand for 500 hours under conditions of 80° C. and a relative humidity of 85%, but a change of hue and the deterioration of the polarization degree were not substantially observed.

EXAMPLE 29

15 parts (0.016 mol) of the compound represented by formula (19) described in Example 5 were dissolved in 300 parts of water, and 20 parts (0.328 mol) of monoethanolamine, 10.3 parts (0.065 mol) of anhydrous copper (II) sulfate and 8.4 parts (0.067 mol) of aqueous ammonia were then added thereto, followed by heating at 80° C. for 8 hours. Next, a large excess of sodium chloride was added to conduct salting-out, and after stirring overnight, the resulting precipitate was collected by filtration, washed with a 3% aqueous sodium chloride solution, and then dried to obtain 16 parts of an azo compound represented by formula (23). Its yield was 97.3%.

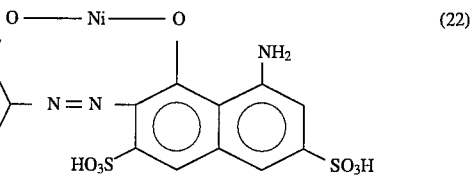

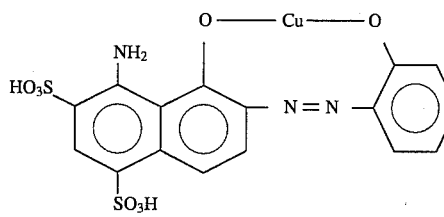
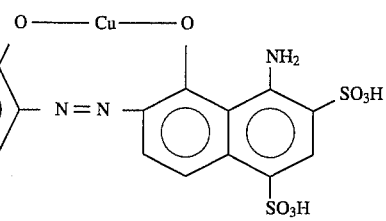

(23)

Composition formula: $C_{34}H_{24}N_6O_{16}S_4Cu_2$

Values of elemental analysis:

|  | C | H | N | S |
|---|---|---|---|---|
| Found (%) | 39.73 | 2.35 | 8.18 | 12.48 |
| Calcd. (%) | 39.92 | 2.29 | 8.10 | 12.39 |

A polyvinyl alcohol film was treated with an aqueous solution of the compound of formula (23) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 695 nm, and V was 99.5%.

This polarizing film was allowed to stand for 500 hours under conditions of 80° C. and a relative humidity of 85%, but a change of hue and the deterioration of the polarization degree were not substantially observed.

EXAMPLE 30

The same procedure as in Example 29 was carried out except that the compound of formula (19) and anhydrous copper sulfate were replaced with 15 parts (0.016 mol) of the compound represented by formula (20) in Example 6 and 5.5 parts (0.038 mol) of zinc (II) sulfate, respectively, to obtain 16 parts of an azo compound represented by the following formula (24). Its yield was 97.0%.

EXAMPLES 31 TO 56

Following the same procedure as in Examples 27 to 30, compounds of formulae (2) and (3) shown in Table 2 were prepared. In this table, hue, $\lambda_{max}$, single-plate transmission and polarization degree were all measured for dyed PVA films. With regard to hydrothermoresistance, each polarizing film was allowed to stand for 500 hours under conditions of 80° C. and a relative humidity of 85%, and afterward, the change of the hue and the deterioration of the polarization degree were observed. The polarizing film in which neither change of the hue nor the deterioration of the polarization degree was observed was evaluated to be ○.

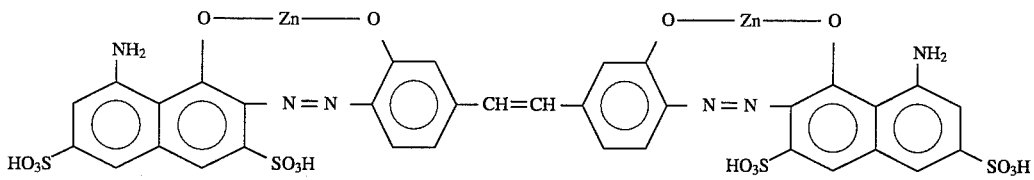

(24)

Composition formula: $C_{34}H_{24}N_6O_{16}S_4Zn_2$

Values of elemental analysis:

|  | C | H | N | S |
|---|---|---|---|---|
| Found (%) | 39.59 | 2.34 | 8.15 | 12.43 |
| Calcd. (%) | 39.71 | 2.28 | 8.30 | 12.41 |

A polyvinyl alcohol film was treated with an aqueous solution of the compound of formula (24) in the same manner as in Example 1 to prepare a polarizing film. This polarizing film was blue. A polarization degree V of the polarizing film at an absorption maximum $\lambda_{max}$ was measured, and as a result, single plate transmission was 42%, $\lambda_{max}$ was 695 nm, and V was 99.0%.

This polarizing film was allowed to stand for 500 hours under conditions of 80° C. and a relative humidity of 85%, but a change of hue and the deterioration of the polarization degree were not substantially observed.

TABLE 2

| Example | Structural Formula | $\lambda_{max}$ (nm) | A*1 | B*2 | Hue | C*3 |
|---|---|---|---|---|---|---|
| 31 | | 630 | 42 | 99 | Blue | ○ |
| 32 | | 675 | 42 | 98 | Blue | ○ |
| 33 | | 685 | 42 | 99 | Blue | ○ |
| 34 | | 625 | 42 | 99 | Blue | ○ |
| 35 | | 670 | 42 | 98 | Blue | ○ |
| 36 | | 615 | 42 | 98 | Blue | ○ |
| 37 | | 635 | 41 | 98 | Blue | |

TABLE 2-continued

| Example | Structural Formula | $\lambda_{max}$ (nm) | A*1 | B*2 | Hue | C*3 |
|---|---|---|---|---|---|---|
| 38 | | 670 | 42 | 99 | Blue | ○ |
| 39 | | 685 | 42 | 99 | Blueish green | ○ |
| 40 | | 685 | 42 | 99 | Blueish green | ○ |
| 41 | | 625 | 42 | 99 | Blue | ○ |
| 42 | | 615 | 42 | 98 | Blue | ○ |
| 43 | | 695 | 42 | 99 | Blueish green | ○ |
| 44 | | 650 | 42 | 99 | Blue | ○ |

TABLE 2-continued

| Example | Structural Formula | $\lambda_{max}$ (nm) | A*1 | B*2 | Hue | C*3 |
|---|---|---|---|---|---|---|
| 45 | | 670 | 42 | 98 | Blue | ○ |
| 46 | | 630 | 42 | 99 | Blue | ○ |
| 47 | | 680 | 42 | 98 | Blue | ○ |
| 48 | | 625 | 42 | 98 | Blue | ○ |
| 49 | | 650 | 41 | 98 | Blue | ○ |
| 50 | | 675 | 42 | 98 | Blue | ○ |
| 51 | | 700 | 42 | 98 | Blueish green | ○ |

TABLE 2-continued

| Example | Structural Formula | $\lambda_{max}$ (nm) | A*1 | B*2 | Hue | C*3 |
| --- | --- | --- | --- | --- | --- | --- |
| 52 | (structure with Cu, NH₂, CH=CH, SO₃H groups) | 695 | 42 | 98 | Blueish green | ○ |
| 53 | (structure with Ni, NH₂, CH=CH, SO₃H groups) | 695 | 42 | 99 | Blueish green | ○ |
| 54 | (structure with Zn, NH₂, CH=CH, OCH₃, SO₃H groups) | 695 | 42 | 99 | Blueish green | ○ |
| 55 | (structure with Cu, CH=CH, SO₃H groups) | 645 | 42 | 99 | Blue | ○ |
| 56 | (structure with Cu, CH=CH, NHCO, CONH, SO₃H groups) | 630 | 42 | 99 | Blue | ○ |

*1: Single plate transmission
*2: Polarization degree
*3: Hydrothermoresistance

COMPARATIVE EXAMPLE 1

The same procedure as in Example 1 was carried out except that the compound synthesized in Example 1 was replaced with a dye represented by C. I. Direct Blue 202 (the following structural formula A), to obtain a polarizing film.

At a maximum absorption wavelength of 695 nm and a single plate transmission of 43%, a polarization degree of the polarizing film was 96%, which meant that the dye was worse than the compounds of the present invention.

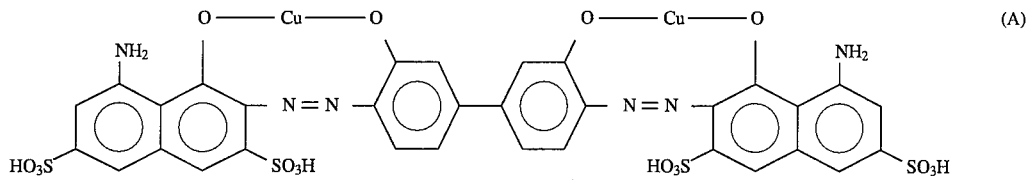

COMPARATIVE EXAMPLE 2

The same procedure as in Example 2 was carried out except that the compound synthesized in Example 2 was replaced with a dye represented by the following formula B disclosed in Example 2 of Japanese Patent Application Laid-open No. 222459/1990, to obtain a polarizing film.

At a maximum absorption wavelength of 645 nm and a single plate transmission of 46%, a polarization degree of the polarizing film was 88%, which meant that the dye was worse than the compounds of the present invention.

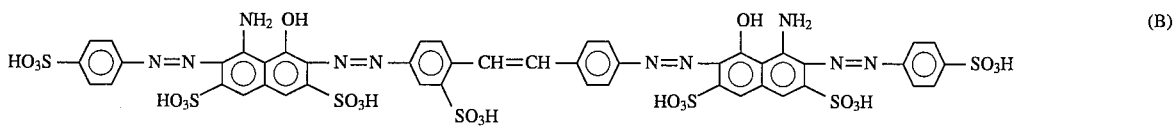

COMPARATIVE EXAMPLE 3

The same procedure as in Example 1 was carried out by the use of 0.08 wt % of a compound of the following structural formula (C) disclosed in Example 10 of Japanese Patent Application Laid-open No. 68902/1991, 0.045 wt % of C. I. Direct Red 2, 0.006 wt % of C. I. Direct Yellow 12 and 0.04 wt % of C. I. Direct Violet 9 to prepare a neutral polarizing film. The polarization degree of the polarizing film at a single plate transmission of 41% was 97%.

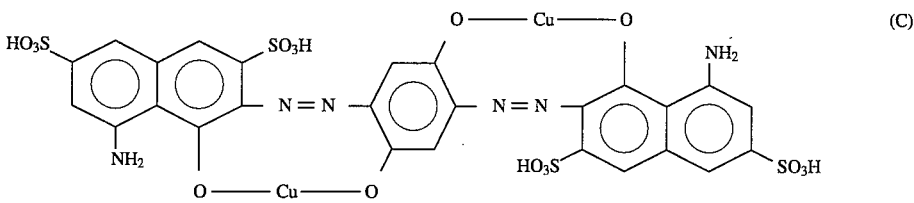

On the other hand, the same procedure as described above was carried out except that the compound of formula (C) was replaced with 0.08 wt % of the compound represented by formula (15), to prepare a neutral polarizing film. The polarization degree of the polarizing film at a single plate transmission of 41% was 99%, which meant that the polarizing film of the present invention was superior.

Furthermore, the same procedure as described above was carried out except that the compound of the formula (C) was replaced with 0.09 wt % of the compound represented by formula (21), to prepare a neutral polarizing film. The polarization degree of the polarizing film at a single polate transmission of 41% was 99%, which meant that the polarizing film of the present invention was superior.

In addition, the same procedure as described above was carried out except that the compound of the formula (C) was replaced with 0.08 wt % of the compound represented by formula (23), to prepare a neutral polarizing film. The polarization degree of the polarizing film at a single plate transmission of 41% was 99%, which meant that the polarizing film of the present invention was superior.

What is claimed is:

1. A polarizing film which comprises a hydrophilic polymer film containing an azo compound represented by formula (1), (2) or (3) which is oriented therein:

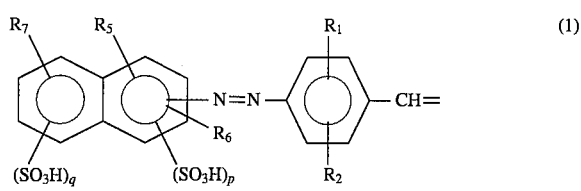

-continued

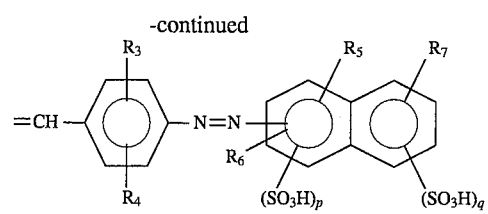

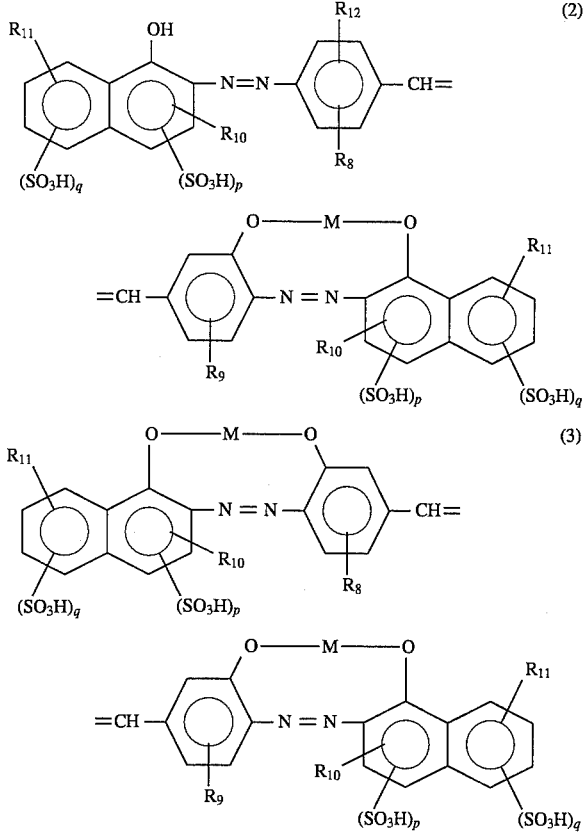

wherein each of $R_1$, $R_3$ and $R_{12}$ is independently a hydrogen atom, halogen atom, hydroxy group, alkyl group having 1 or 2 atoms, or alkoxy group having 1 or 2 carbon atoms; each of $R_2$, $R_4$, $R_8$ and $R_9$ is independently a hydrogen atom, hydroxyl group, alkyl group having 1 or 2 carbon atoms, alkoxy group having 1 or 2 carbon atoms, or acetylamino group; $R_5$ is a hydroxyl group or amino group at the o-position or p-position to the azo group; each of $R_6$ and $R_{10}$ is a carboxyl group, or an alkoxy group having 1 or 2 carbon atoms; each of $R_7$ and $R_{11}$ is a hydrogen atom, hydroxyl group, amino group, methylamino group, β-hydroxyethylamino group, acetylamino group, phenylamino group unsubstituted or substituted with a nitro group, amino group, hydroxyl group, alkyl group having 1 or 2 carbon atoms, carboxyl group, sulfonic group or chlorine atom; or benzoylamino group unsubstituted or substituted with a nitro group, amino group, hydroxyl group, alkyl group having 1 or 2 carbon atoms, carboxyl group, sulfonic group or chlorine atom; p is 0 or 1; and q is 0, 1 or 2; and M is copper, nickel, zinc or iron.

2. The polarizing film according to claim 1 wherein said hydrophilic polymer film is at least one selected from the group consisting of polyvinyl alcohol, polyvinyl formal, polyvinyl acetal and polyvinyl butyral resins, copolymers thereof with ethylene, propylene, acrylic acid or N-acryloylmalcimide, and cellulosic resins.

3. The polarizing film according to claim 1 wherein said hydrophilic polymer film is stretched in a stretch ratio of from 2 times to 9 times.

4. The polarizing film according to claim 1 wherein said hydrophilic polymer film is polyvinyl alcohol resin and is stretched in a stretch ratio of from 2.5 times to 6 times.

5. The polarizing film according to claim 1 wherein the film is further treated with boric acid solution after stretching and orientation of the film.

6. The polarizing film according to claim 5 wherein the treatment with boric acid solution is carried out in a concentration of 1 to 15% by weight of boric acid and at a temperature of 30° to 80° C.

* * * * *